US011711194B2

(12) United States Patent
Meng et al.

(10) Patent No.: US 11,711,194 B2
(45) Date of Patent: Jul. 25, 2023

(54) MULTI-BRANCH NOMA WIRELESS COMMUNICATION

(71) Applicant: Google LLC, Mountain View, CA (US)

(72) Inventors: Ling-San Meng, New Taipei (TW); Chien-Hsin Tang, Taipei (TW)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/059,156

(22) PCT Filed: Jun. 20, 2019

(86) PCT No.: PCT/US2019/038295
§ 371 (c)(1),
(2) Date: Nov. 25, 2020

(87) PCT Pub. No.: WO2019/246429
PCT Pub. Date: Dec. 26, 2019

(65) Prior Publication Data
US 2021/0203465 A1   Jul. 1, 2021

Related U.S. Application Data

(60) Provisional application No. 62/688,555, filed on Jun. 22, 2018.

(51) Int. Cl.
*H04L 5/00* (2006.01)
*H04B 7/204* (2006.01)
*H04W 48/12* (2009.01)

(52) U.S. Cl.
CPC ......... *H04L 5/0091* (2013.01); *H04B 7/2043* (2013.01); *H04L 5/0037* (2013.01); *H04L 5/0053* (2013.01); *H04W 48/12* (2013.01)

(58) Field of Classification Search
CPC ... H04L 5/0091; H04L 5/0037; H04L 5/0053; H04L 5/0026; H04B 7/2043; H04W 48/12; H04J 99/00
See application file for complete search history.

(56) References Cited

U.S. PATENT DOCUMENTS 9,131,457 B2   9/2015   Nam et al.
9,712,272 B2   7/2017   Zhu et al.
(Continued)

FOREIGN PATENT DOCUMENTS

CN   104205717   12/2014
CN   104488206    4/2015
(Continued)

OTHER PUBLICATIONS

"International Preliminary Report on Patentability", Application No. PCT/US2019/045346, dated Nov. 13, 2020, 12 pages.
(Continued)

*Primary Examiner* — Ayaz R Sheikh
*Assistant Examiner* — Debebe A Asefa
(74) *Attorney, Agent, or Firm* — Colby Nipper PLLC

(57) ABSTRACT

The present disclosure describes methods and systems applicable to multi-branch non-orthogonal (NOMA) wireless communication. The described methods and systems include a base station (120) determining (705) a first plurality of multiple access resources and an order of the first plurality of multiple access resources. The base station (120) transmits (710), to a user equipment (110), a message that includes the determined first plurality of multiple access resources and the determined order of the first plurality of multiple access resources. The user equipment (110) transmits, to the base station (120), a multi-branch data stream using a second plurality of multiple access resources that is determined from the first plurality of multiple access resources, after which the base station (120) decodes (730) data from the multi-branch data stream by combining the second plurality of multiple access resources in accordance with the determined order of the first plurality of multiple access resources.

20 Claims, 8 Drawing Sheets

(56) References Cited

U.S. PATENT DOCUMENTS

| | | |
|---|---|---|
| 9,794,924 B2 | 10/2017 | Lee et al. |
| 10,218,422 B2 | 2/2019 | Raghavan et al. |
| 10,701,684 B2 | 6/2020 | Yoo et al. |
| 10,750,488 B2 | 8/2020 | He et al. |
| 10,904,868 B2 | 1/2021 | Lei et al. |
| 11,063,705 B2 | 7/2021 | Chou |
| 11,108,440 B2 | 8/2021 | Cha et al. |
| 11,424,799 B2 | 8/2022 | Meng |
| 11,425,699 B2 | 8/2022 | Meng |
| 11,469,866 B2 | 10/2022 | Wu et al. |
| 2011/0158117 A1 | 6/2011 | Ho et al. |
| 2013/0028213 A1 | 1/2013 | Ko et al. |
| 2015/0195795 A1 | 7/2015 | Loehr et al. |
| 2015/0312074 A1 | 10/2015 | Zhu et al. |
| 2016/0066345 A1 | 3/2016 | Sun et al. |
| 2016/0323832 A1 | 11/2016 | Love et al. |
| 2017/0012754 A1 | 1/2017 | Sun et al. |
| 2017/0251462 A1 | 8/2017 | Chae et al. |
| 2017/0310417 A1 | 10/2017 | Jung et al. |
| 2017/0331573 A1 | 11/2017 | Li |
| 2017/0332358 A1 | 11/2017 | Park et al. |
| 2018/0048348 A1 | 2/2018 | Gau et al. |
| 2018/0049190 A1 | 2/2018 | Abedini et al. |
| 2018/0070274 A1 | 3/2018 | Ode |
| 2018/0070335 A1 | 3/2018 | Amuru et al. |
| 2018/0077685 A1 | 3/2018 | Wu et al. |
| 2018/0115386 A1 | 4/2018 | Shin et al. |
| 2018/0123765 A1 | 5/2018 | Cao et al. |
| 2018/0124684 A1 | 5/2018 | Kwon et al. |
| 2018/0139774 A1 | 5/2018 | Ma et al. |
| 2018/0145797 A1 | 5/2018 | Yeo et al. |
| 2018/0152907 A1 | 5/2018 | Zhang et al. |
| 2018/0167932 A1 | 6/2018 | Papasakellariou |
| 2018/0199359 A1 | 7/2018 | Cao et al. |
| 2018/0270854 A1* | 9/2018 | Lee .................. H04W 72/0446 |
| 2018/0302191 A1 | 10/2018 | Park et al. |
| 2018/0324770 A1* | 11/2018 | Nogami .................. H04L 5/005 |
| 2018/0337816 A1 | 11/2018 | Herath et al. |
| 2019/0045489 A1 | 2/2019 | He et al. |
| 2019/0053226 A1 | 2/2019 | Xiong et al. |
| 2019/0081657 A1 | 3/2019 | Zeng et al. |
| 2019/0082456 A1 | 3/2019 | Kim et al. |
| 2019/0132076 A1 | 5/2019 | Cheng et al. |
| 2019/0158338 A1 | 5/2019 | Herath et al. |
| 2019/0174472 A1 | 6/2019 | Lee et al. |
| 2019/0190753 A1 | 6/2019 | Bayesteh et al. |
| 2019/0289628 A1 | 9/2019 | Xiong et al. |
| 2019/0312694 A1 | 10/2019 | Jia et al. |
| 2019/0313402 A1 | 10/2019 | Lei et al. |
| 2019/0363846 A1 | 11/2019 | Lei et al. |
| 2019/0386783 A1 | 12/2019 | Chou |
| 2020/0014457 A1 | 1/2020 | Tang |
| 2020/0059322 A1 | 2/2020 | Lei et al. |
| 2020/0059935 A1* | 2/2020 | Qian ................. H04W 72/0486 |
| 2020/0077402 A1 | 3/2020 | Lei et al. |
| 2020/0092057 A1 | 3/2020 | Herath et al. |
| 2020/0119958 A1 | 4/2020 | Bayesteh et al. |
| 2020/0154442 A1 | 5/2020 | Zhou |
| 2020/0154481 A1 | 5/2020 | Goto et al. |
| 2020/0196335 A1 | 6/2020 | Lei et al. |
| 2020/0213901 A1 | 7/2020 | Yoshimoto et al. |
| 2020/0404634 A1 | 12/2020 | He et al. |
| 2021/0029693 A1 | 1/2021 | Meng |
| 2021/0045181 A1 | 2/2021 | Li et al. |
| 2021/0135825 A1 | 5/2021 | Pan et al. |
| 2021/0211171 A1 | 7/2021 | Meng |
| 2021/0266124 A1 | 8/2021 | Wu et al. |
| 2021/0307003 A1 | 9/2021 | Chou |
| 2022/0346087 A1 | 10/2022 | Meng |

FOREIGN PATENT DOCUMENTS

| | | |
|---|---|---|
| CN | 108011696 | 5/2018 |
| EP | 3068060 | 9/2016 |
| WO | 2016188312 | 12/2016 |
| WO | 2017050760 | 3/2017 |
| WO | 2017055271 | 4/2017 |
| WO | 201702950 | 6/2017 |
| WO | 2017167198 | 10/2017 |
| WO | 2017194001 | 11/2017 |
| WO | 2017209570 | 12/2017 |
| WO | 2017212104 | 12/2017 |
| WO | 2018021819 | 2/2018 |
| WO | 2018031620 | 2/2018 |
| WO | 2018031770 | 2/2018 |
| WO | 2018032014 | 2/2018 |
| WO | 2018038410 | 3/2018 |
| WO | 2018039160 | 3/2018 |
| WO | 2018061572 | 4/2018 |
| WO | 2018062842 | 4/2018 |
| WO | 2018062976 | 4/2018 |
| WO | 2018064582 | 4/2018 |
| WO | 2018084559 | 5/2018 |
| WO | 2018085045 | 5/2018 |
| WO | 2018128200 | 7/2018 |
| WO | 2018130115 | 7/2018 |
| WO | 2018174649 | 9/2018 |
| WO | 2019240887 | 12/2019 |
| WO | 2019240903 | 12/2019 |
| WO | 2019245662 | 12/2019 |
| WO | 2019246429 | 12/2019 |
| WO | 2020033434 | 2/2020 |
| WO | 2020069090 | 4/2020 |

OTHER PUBLICATIONS

"International Preliminary Report on Patentability", Application No. PCT/US2019/029691, dated Dec. 15, 2020, 7 pages.

"International Preliminary Report on Patentability", Application No. PCT/US2019/032285, dated Dec. 15, 2020, 7 pages.

"International Preliminary Report on Patentability", Application No. PCT/US2019/031059, dated Dec. 22, 2020, 11 pages.

"International Preliminary Report on Patentability", Application No. PCT/US2019/038295, dated Dec. 22, 2020, 8 pages.

"Procedures related consideration to NoMA", 3GPP TSG RAN WG1 Meeting #92bis—R1-1804398, Apr. 2018, 6 pages.

"Status Report to TSG", 3GPP TSG RAN meeting #77—RP-172105, Sep. 2017, 4 pages.

"Corrected Notice of Allowance", U.S. Appl. No. 16/387,000, dated Jun. 17, 2021, 2 pages.

"International Preliminary Report on Patentability", PCT Application No. PCT/US2019/053105, dated Apr. 8, 2021, 9 pages.

"Notice of Allowance", U.S. Appl. No. 16/387,000, dated Mar. 31, 2021, 8 pages.

"Extended European Search Report", EP Application No. 22159471. 6, dated May 24, 2022, 9 pages.

"Notice of Allowance", U.S. Appl. No. 17/042,792, dated Apr. 12, 2022, 12 pages.

"Notice of Allowance", U.S. Appl. No. 17/059,131, dated May 12, 2022, 11 pages.

"Notice of Allowance", U.S. Appl. No. 17/260,862, dated May 26, 2022, 8 pages.

Georgakopoulos, et al., "Preliminary results on multi-antenna access and link enhancements", Jun. 1, 2017, 120 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.

"3rd Generation Partnership Project; Technical Specification Group Radio Access Network; NG-RAN; Architecture description (Release 15)", 3GPP TS 38.401 V15.0.0, Dec. 2017, 9 Pages.

"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.

"3rd Generation Partnership Project; Technical Specification Group Radio Access Network; NR; Multiplexing and channel coding (Release 15)", 3GPP TS 38.212 V15.2.0, Jun. 2018, 105 pages.

"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.

(56) References Cited

OTHER PUBLICATIONS

"3rd Generation Partnership Project; Technical Specification Group Radio Access Network; NR; Physical channels and modulation (Release 15)", 3GPP TS 38.211 V15.2.0, Jun. 2018, 46 pages.
"3rd Generation Partnership Project; Technical Specification Group Radio Access Network; NR; Physical layer procedures for control (Release 15)", 3GPP TS 38.213 V15.2.0, Jun. 2018, 49 pages.
"3rd Generation Partnership Project; Technical Specification Group Radio Access Network; NR; Physical layer procedures for data (Release 15)", 3GPP TS 38.214 V15.2.0, Jun. 2018, 95 pages.
"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.
"3rd Generation Partnership Project; Technical Specification Group Radio Access Network; Study on Integrated Access and Backhaul; (Release 15)", 3GPP TR 38.874 V0.2.1, May 2018, 19 Pages.
"Considerations on Link Rate Adaptation for NOMA", 3GPP TSG RAN WG1 Meeting #93, Busan, Korea, May 2018, 4 pages.
"Considerations on NOMA Procedures", 3GPP TSG RAN WG1 Meeting #93, Busan, Korea, May 2018, 3 pages.
"CU-DU Interface: Overall Categorization of C-Plane and U-Plane", TSG-RAN Working Group 3 meeting #95, Athens, Greece, Feb. 13-17, 2017, Feb. 2017, 9 pages.
"Discussion on Categorization of MA Schemes and Target Scenarios", 3GPP TSG RAN WG1 Meeting #86, Gothenburg, Sweden, Aug. 2016, 3 pages.
"Discussion on NOMA Procedure", 3GPP TSG RAN WG1 Meeing #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"F1 Interface: Radio Resource Configuration Management", TSG-RAN Working Group 3 meeting #96, Hangzhou, China, May 15-19, 2017, 4 pages.
"Final Office Action", U.S. Appl. No. 16/387,000, dated Nov. 24, 2020, 13 pages.
"Final Report of 3GPP TSG RAN WG1 #86bis v1.0.0", Final Report of 3GPP TSG RAN WG1 #86bis v1.0.0, (Lisbon, Portugal), dated Oct. 2016, 160 pages.
"Final Report of 3GPP TSG RAN WG1 #92bis v1.0.0AN WG1 #92bis v1.0.0", Final Report of 3GPP TSG RAN WG1 #92bis v1.0.0, (Sanya, China), dated Apr. 2018, 195 pages.
"Grant-Free UL Transmissions in NR", 3GPP TSG-RAN WG1 #86bis, Lisbon, Portugal, Oct. 2016, 8 pages.
"Grant-less and Non-orthogonal UL Transmissions in NR", 3GPP TSG-RAN WG1 #86, Gothenburg, Sweden, Aug. 22-26, 2016, 5 pages.
"International Search Report and Written Opinion", PCT Application No. PCT/US2019/045346, dated Oct. 17, 2019, 17 pages.
"International Search Report and Written Opinion", PCT Application No. PCT/US2019/053105, dated Dec. 10, 2019, 17 pages.
"International Search Report and Written Opinion", PCT Application No. PCT/US2019/029691, dated Jul. 19, 2019, 12 pages.
"International Search Report and Written Opinion", PCT Application No. PCT/US2019/032285, dated Aug. 14, 2019, 85 pages.
"International Search Report and Written Opinion", PCT Application No. PCT/US2019/031059, dated Aug. 19, 2019, 16 pages.
"International Search Report and Written Opinion", PCT Application No. PCT/US2019/038295, dated Sep. 4, 2019, 14 pages.
"Key Processing Modules at Transmitter Side for NOMA", 3GPP TSG RAN WG1 Meeting #93, Busan, Korea, May 2018, 11 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"NOMA Related Procedure", 3GPP TSG RAN WG1 Meeting #93, Busan, Korea, May 2018, 8 pages.
"Non-Final Office Action", U.S. Appl. No. 16/387,000, dated Jun. 4, 2020, 10 Pages.
"Non-Final Office Action", U.S. Appl. No. 16/427,712, dated Nov. 4, 2020, 17 pages.
"On Categorization of MA Schemes for NR", 3GPP TSG-RAN WG1 Meeting #86, Gothenburg, Sweden, Aug. 2016, 2 pages.
"Receivers for NOMA", 3GPP TSG RAN WG1 Meeting #92, Athens, Greece, Feb. 2018, 8 Pages.
"Summary of [86-18] Email Discussion on Categorization for NR MA Schemes", 3GPP TSG RAN WG1 Meeting #86bis, Lisbon, Portugal, Oct. 10-14, 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Typical multi-user receivers for NOMA", 3GPP TSG RAN WG1 Meeting #92, Athens, Greece, Feb. 26-Mar. 2, 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"WF on UL Multiple Access Scheme Categorization for mMTC", 3GPP TSG RAN WG1 #86, Gothenburg, Sweden, Aug. 2016, 3 pages.
"Written Opinion", PCT Application No. PCT/US2019/045346, dated Jun. 22, 2020, 7 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Wu, "Handling Overheating in a Wireless-Communication Device", Technical Disclosure Commons; Retrieved from https://www.tdcommons.org/dpubs_series/2343, Jul. 12, 2019, 22 pages.
Yuan, et al., "Blind Multi-User Detection for Autonomous Grant-Free High-Overloading MA Without Reference Signal", ZTE Corporation, South Keji Road, 55, Shenzhen, China, 508118, Dec. 7, 2017, 13 pages.
Yuan, "NOMA Study in 3GPP for 5G", ISTC 2018, Hong Kong, Dec. 2018, 32 pages.
"Foreign Notice of Allowance", CN Application No. 201980027939.8, dated Jan. 5, 2023, 7 pages.
"Non-Final Office Action", U.S. Appl. No. 17/811,747, dated Nov. 25, 2022, 11 pages.
"Discussion on NoMA related procedure", 3GPP TSG RAN WG1 Meeting #93, R1-1806753, May 2018.
"Foreign Office Action", KR Application No. 10-2021-7000545, dated Apr. 10, 2023, 11 pages.
"Notice of Allowance", U.S. Appl. No. 17/811,747, dated Mar. 20, 2023, 13 pageds.

* cited by examiner

MULTI-BRANCH NOMA WIRELESS COMMUNICATION

BACKGROUND

Multiple access (MA) wireless-communication techniques are an important aspect of functionality of a wireless-communication network. In general, multiple access wireless-communication techniques provide for two or more user equipment (UE) devices, such as smart phones, to share resources of a wireless-communication network in an efficient and effective manner. The resources may include, for example, physical resource blocks that span a time, a frequency, or a code domain that the UE devices share while communicating with a base station that supports the wireless-communication network.

Today, wireless network communication providers are implementing non-orthogonal multiple access (NOMA) techniques to support Fifth Generation New Radio (5G NR) wireless communications. Using NOMA techniques, a UE may transmit a multi-branch data stream to the base station. Multiple MA resources support the transmission of the multi-branch data stream, where each MA resource consists of at least one physical resource block and an MA signature, which in effect, distinguishes data streams of the multi-branch data stream.

The use of grant-free transmissions removes resource-scheduling restrictions from a wireless-communication network, and NOMA techniques remove capacity limitations that other techniques, such as orthogonal multiple access (OMA) techniques, might impose upon the wireless-communication network. However, the use of multi-branch NOMA wireless-communication techniques increases the complexity of distinguishing signals and decoding data at the base station, especially when multiple UEs perform multi-branch NOMA transmissions and the base station is tasked with consistently distinguishing the signals and decoding data from the multiple UEs. In order for the wireless-communication network to use available resources in an effective and efficient manner and increase its capacity, techniques to manage the multiple MA resources are needed.

SUMMARY

The present disclosure describes methods and systems applicable to multi-branch non-orthogonal (NOMA) wireless communication. Multi-branch NOMA wireless communication, in general, includes a transmitting device performing a data transmission using a multiple access (MA) resource, where the MA resource consists of a physical resource (e.g., a frequency and time domain of an air interface) and an MA signature. The MA resource may accommodate multiple data streams of bit-level information, where each data stream, or branch, may share the same physical resource. Through NOMA encoding and decoding techniques, as respectively performed by the transmitting device and a receiving device, each data stream is distinguishable through the MA signature. Accordingly, multiple bit-level data streams having multiple, respective MA signatures are considered a multi-branch data stream. The described methods and systems include a base station determining a first plurality of multiple access resources and an order of the first plurality of multiple access resources. The base station transmits, to a user equipment (UE), a message that includes the determined first plurality of multiple access resources and the determined order of the first plurality of multiple access resources. The UE transmits, to the base station, a multi-branch data stream (e.g., multiple bit-level data streams having multiple, respective MA signatures) using a second plurality of multiple access resources that is determined from the first plurality of multiple access resources, after which the base station decodes data from the multi-branch data stream by combining the second plurality of multiple access resources in accordance with the determined order of the first plurality of multiple access resources.

In general, the described methods and systems address problems associated with the NOMA wireless-communication techniques as practiced today. The described methods and systems bring consistency and clarity to the determining and use of multiple access resources.

In some aspects, a method for receiving and decoding data from a multi-branch data stream is described. The method, performed by a base station, incudes the base station determining a first plurality of MA resources and an order of the first plurality of MA resources. The base station transmits, to a UE, a message that includes information that identifies the determined first plurality of MA resources and the determined order of the first plurality of MA resources. The method continues, where the base station determines a second plurality of MA resources that is a subset of the determined first plurality of MA resources. After receiving the multi-branch transmission from the UE, the base station decodes data from the multi-branch transmission by combining the determined second plurality of MA resources in accordance with the determined order of the first plurality of MA resources. The described method provides the base station a technique to receive (and decode) a multi-branch data stream, effectuating a wireless-communication network (in which the base station is wirelessly communicating) to use available resources in an effective and efficient manner and increase its capacity.

In other aspects, a method for transmitting a multi-branch data stream to a base station is described. The method, performed by a UE, includes receiving, from the base station, a message that includes information that identifies a determined first plurality of MA resources and a determined order of the first plurality of MA resources. The UE determines a second plurality of MA resources that is a subset of the first plurality of MA resources; and transmits, to the base station, the multi-branch data stream using the determined second plurality of MA resources in accordance with the determined order of the first plurality of MA resources. The described method provides the UE a technique to transmit a multi-branch data stream, effectuating a wireless-communication network (in which the UE is wirelessly communicating) to use available resources in an effective and efficient manner and increase its capacity.

In yet other aspects, a base station is described. The base station includes a transceiver; a processor, and computer-readable storage media comprising instructions to implement a non-orthogonal multiple-access (NOMA) manager. The NOMA manager, upon execution by the processor, directs the base station to determine a first plurality of MA resources and an order of the first plurality of MA resources and transmit, through the transceiver and to a UE, a message that includes information that identifies the determined first plurality of MA resources and the determined order of the first plurality of MA resources. Execution of the NOMA manager by the processor further directs the base station to determine a second plurality of MA resources that is a subset of the determined first plurality of MA resources, receive a multi-branch data stream from the UE, and decode data from the multi-branch data stream. Decoding the data is a result of combining the determined second plurality of MA resources in accordance with the determined order of the first plurality of MA resources.

The details of one or more implementations of managing MA resources used for multi-branch NOMA wireless communications are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of managing MA resources that support multi-branch NOMA wireless communications. The use of the same reference numbers in different instances in the description and the figures may indicate like elements.

DETAILED DESCRIPTION

Techniques for managing resources used for multi-branch NOMA wireless communications are described below. The techniques establish clarity and consistency across methods and systems used to transmit a multi-branch data stream, receive the multi-branch data stream, and decode data contained within the multi-branch data stream.

While features and concepts of the described systems and methods for a multi-branch NOMA wireless communication can be implemented in any number of different environments, systems, devices, and/or various configurations, aspects of multi-branch NOMA wireless communication are described in the context of the following example devices, systems, and configurations.

Operating Environment

Figure 1:
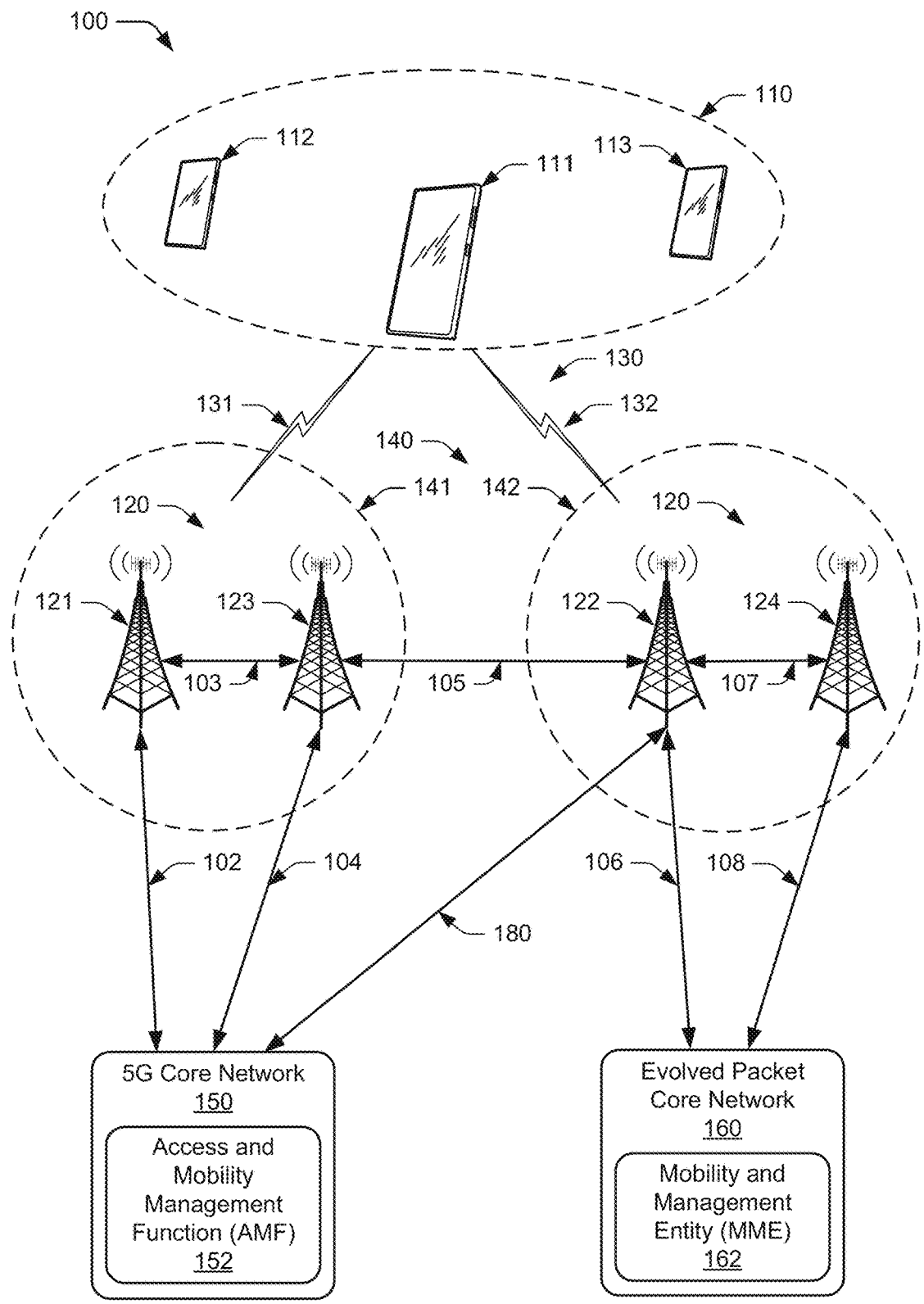
FIG. 1 illustrates an example operating environment in which various aspects of managing MA resources that support multi-branch NOMA wireless communications can be implemented.

FIG. 1 illustrates an example operating environment 100 in which various aspects of managing MA resources that support multi-branch NOMA wireless communications can be implemented. The example environment 100 includes multiple user equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Within the operating environment 100, where multi-branch NOMA wireless communications between the UE 110 and the base station 120 may occur, the UE 110 may transmit multi-branch data streams (e.g., using MA resources) to the base stations 120 using the wireless links 130. The UE 110 and the base stations 120 may, as detailed below, perform complementary methods to manage the MA resources supporting the multi-branch NOMA wireless communications, resulting in efficient and effective transmission and decoding of data contained within the multi-branch data streams.

Figure 2:
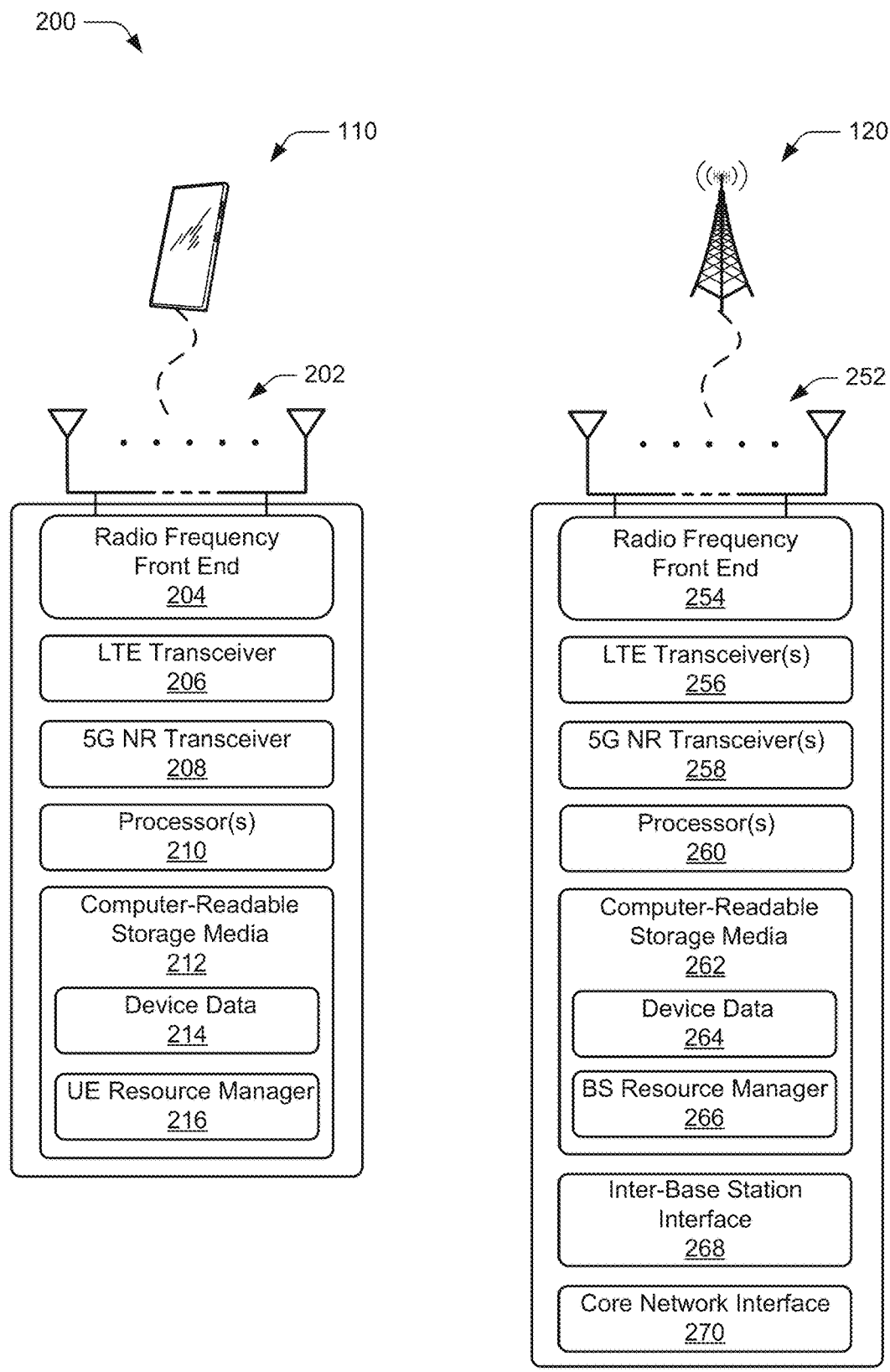
FIG. 2 illustrates example details of a user equipment and a base station supporting various aspects of managing MA resources that support multi-branch NOMA wireless communications.

FIG. 2 illustrates example details 200 of a user equipment and a base station supporting various aspects of managing MA resources that support multi-branch NOMA wireless communications. The multiple UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes a UE resource manager 216 having executable instructions. Alternately or additionally, the UE resource manager 216 may be implemented in whole or part as hardware logic or circuitry integrated with or separate from other components of the UE 110. In at least some aspects, the UE resource manager 216 (e.g., the executable instructions of the UE resource manager 216) configures the RF front end 204, the LTE transceiver 206, and/or the 5G NR transceiver 208 to implement the techniques performed by the UE 110 as related to managing MA resources used for multi-branch NOMA wireless communications as described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station resource manager 266 (BS Resource Manager 266) having executable instructions. Alternately or additionally, the base station resource manager 266 may be implemented in whole or part as hardware logic or circuitry integrated with or separate from other components of the base stations 120. In at least some aspects, and in addition to managing communication with a core network, the instructions of the base station resource manager 266, when executed by the processor(s) 260, configures the RF front end 254, the LTE transceiver 256, and/or the 5G NR transceiver 258 to implement the techniques performed by the base stations 120 as related to managing MA resources used for multi-branch wireless communications as described herein. The base stations 120 include an inter-base station interface 268, such as an Xn and/or X2 interface, which the base station resource manager 266 configures to exchange user-plane and control-plane data between another base station 120, to manage the communication of the base stations 120 with the UE 110. The base stations 120 include a core network interface 270 that the base station resource manager 266 configures to exchange user-plane and control-plane data with core network functions and entities.

Figure 3:
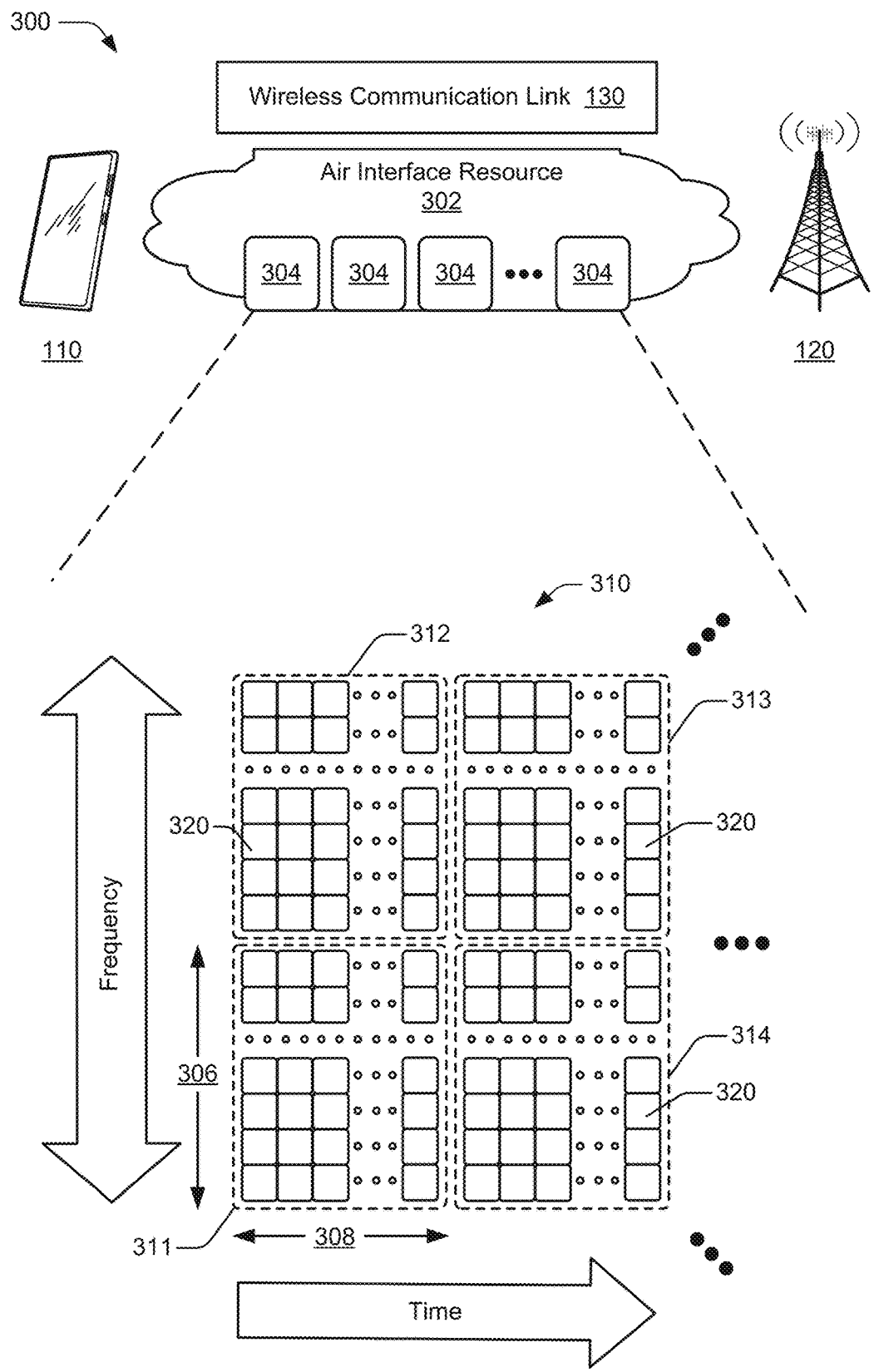
FIG. 3 illustrates example details of an air interface resource that extends between a user equipment and a base station and with which various aspects of managing MA resources supporting multi-branch NOMA wireless communication are implemented.

FIG. 3 illustrates example details 300 of an air interface resource 302 that extends between a UE and a base station and with which various aspects of managing MA resources supporting multi-branch NOMA wireless communication are implemented. In general, the air interface resource 302 provides the MA resources described herein.

The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 304) of the air interface resource 302 for uplink and downlink communications. Each resource block 310 of network access resources may be allocated to support respective wireless communication link 130 of multiple UE 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol.

As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth. In example implementations, the UE 110 is communicating with the base station 120 through access provided by portions of the air interface resource 302.

The base station resource manager 266 (e.g., the processor(s) 260 executing the instructions of the base station resource manager 266) may allocate one or more resource elements 320 or individual subcarriers to the UE 110. As part of allocating the one or more resource elements 320 or individual subcarriers to the UE 110, the base station resource manager 266 may perform operations that identify the allocated one or more resource elements or the allocated individual subcarriers as multiple access (MA) resources.

Figure 4:
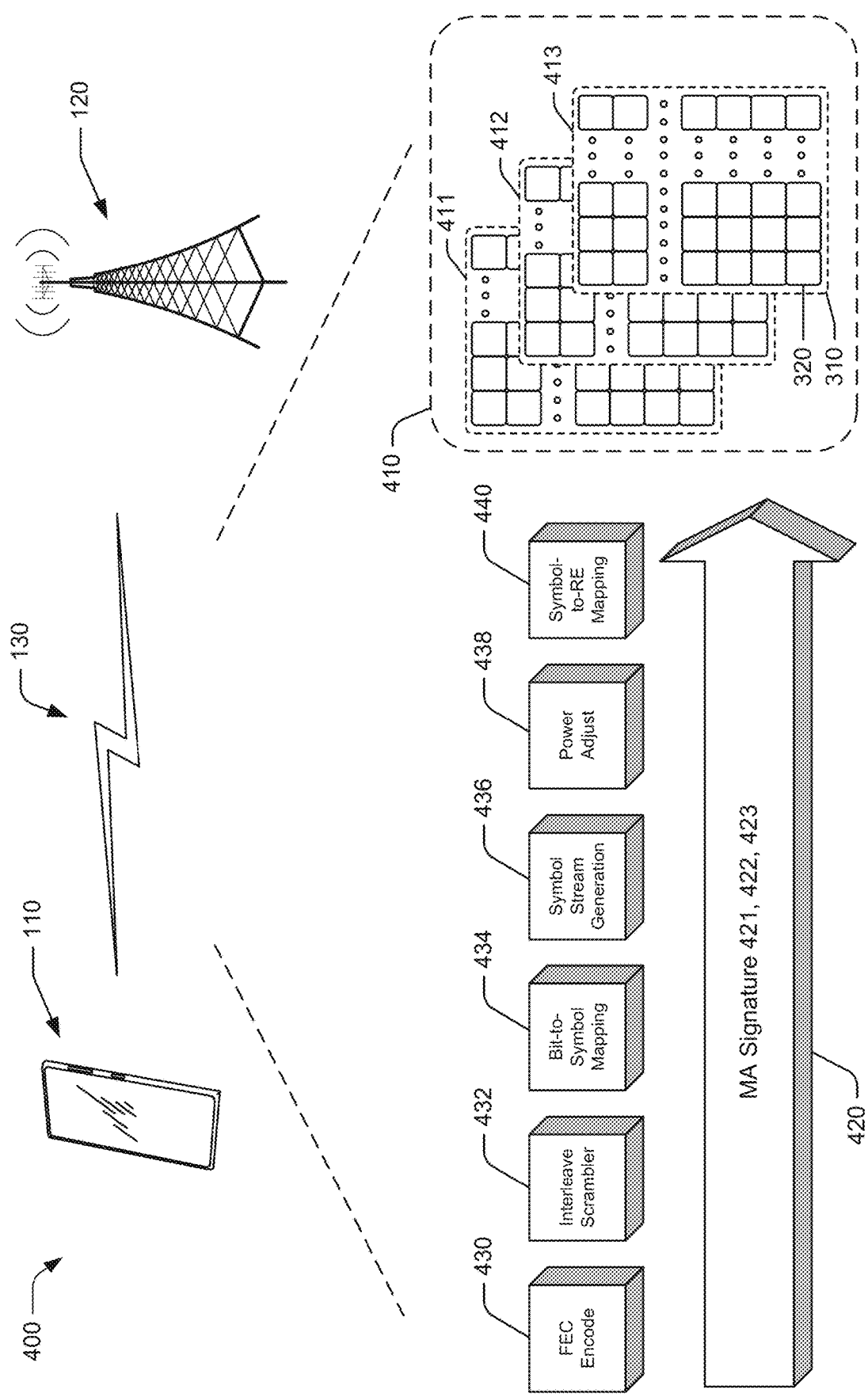
FIG. 4 illustrates example detail aspects of multi-branch NOMA wireless communications.

FIG. 4 illustrates example details 400 of multi-branch NOMA wireless communication using resources of the air interface resource 302 of FIG. 3. As illustrated, the UE 110 is transmitting a multi-branch data stream 410 to the base station(s) 120 using the wireless link 130. In this example instance, the UE 110 transmits the multi-branch data stream 410 using layers of a multiple access (MA) resource, illustrated as layer(s) (e.g., layers 411, 412, and 413) that use resources of resource block 310 of the air interface resource 302 of FIG. 3. Each layer 411 through 413 supports a branch of the multi-branch data stream 410.

Although the layers 411 through 413 share corresponding physical resources that span common frequency and time domains (e.g., resource block 310 and resource elements(s) 320), the layers 411 through 413 (e.g., bit-level data carried by the layers) are distinguishable through multiple access (MA) signatures(s) 420. The UE 110 (e.g., the processor 210 executing the instructions of the UE resource manager 216) may perform multiple operations while transmitting the multi-branch data stream 410 to associate a MA signature 420 (e.g., MA signature 421 through 423) to a respective layer (e.g., layer 411 through 413). Such operations include, for example, forward error correction and encoding 430, bit-level interleaving and scrambling 432, bit-to-symbol mapping 434, symbol stream generation 436, power adjustment 438, and symbol-to-resource element mapping 440. Examples of the resultant MA signature 420 associated with each respective layer 410 include an orthogonal code, a spreading code, or a transmission power.

Each layer 411 through 413 of the multi-branch data stream, in general, may carry different bits of data. Furthermore, and in general, the layers 411 through 413 carrying the bits of data may be transmitted by the UE 110 in a determined order (e.g., a sequence) and combined (e.g., aggregated) by the base station 120 following the determined order, effective to decode data.

Multi-Branch NOMA Wireless Communication Methods

Example methods 500 and 600 are described with reference to FIGS. 5 and 6 in accordance with one or more aspects of multi-branch NOMA wireless communication. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
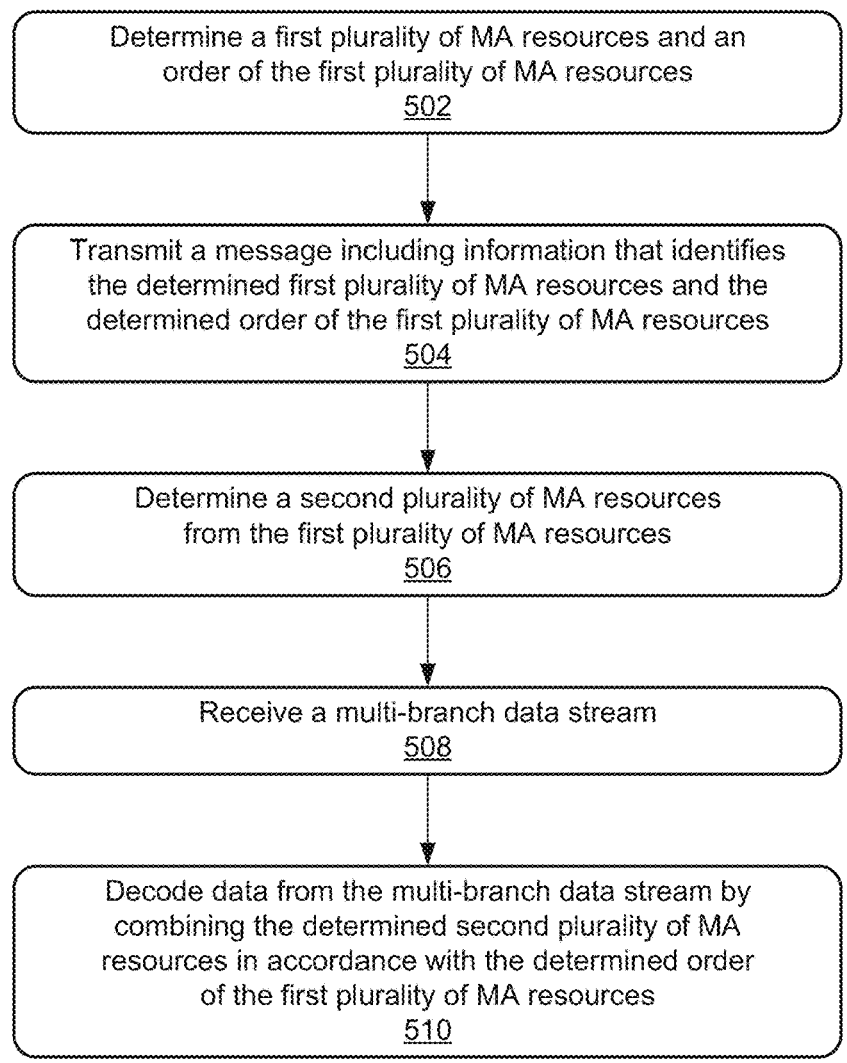
FIG. 5 illustrates an example method performed by a base station to decode data received through a multi-branch data stream in accordance with one or more aspects of multi-branch NOMA wireless communications.

FIG. 5 illustrates an example method 500 performed by a base station to decode data received through a multi-branch data stream in accordance with multi-branch NOMA wireless communications. The method 500 is described in the form of a set of blocks 502-510 that specify operations that can be performed. However, operations are not necessarily limited to the sequence shown in FIG. 5 or described herein, for the operations may be implemented in alternative sequences or in fully or partially overlapping manners. Operations represented by the method 500 may be performed by the base station 120 of FIG. 1 and performed using elements of FIGS. 1-4.

At block 502, the base station (e.g., the processor 260 of the base station 120 executing the code of the base station resource manager 266) determines a first plurality of multiple access (MA) resources and an order of the first plurality of MA resources. In some instances, the base station 120 may determine the order of the first plurality of MA resources from a wireless-communication specification that is implemented by the base station.

At block 504, the base station 120 transmits, to a user equipment (e.g., the UE 110), a message that identifies the determined first plurality of MA resources. The message may include, for example, identities of physical resources (e.g., resource block(s) 310 including resource element(s) 320) of the air interface 302 linking the base station to the UE 110) and a plurality of MA signature(s) (e.g., MA signature 420), where each MA signature (e.g., MA signature 421 through 423) corresponds to a layer (e.g., layer 411 through 413) of the first plurality of MA resources.

Various techniques may be used to transmit the message at block 504. For example, in some instances the base station 120 may transmit the message to the UE 110 using a dedicated signal such as a Radio Resource Control (RRC) message. In other instances, the base station 120 may transmit the message to the UE 110 using a broadcast signal.

At block 506, the base station 120 determines a second plurality of MA resources that is a subset of the first plurality of MA resources. In some instances, the base station may determine the second plurality of resources from a mapping between the first plurality of MA resources and available Demodulation Reference Signals (DMRS) or preambles and, subsequently, transmit a message to the UE 110 that includes the mapping. In other instances, the base station 120 may determine the second plurality of resources from an Uplink Control Information (UCI) message received from the UE 110 that identifies the second plurality of MA resources.

At block 508, the base station 120 receives, from the UE 110, a multi-branch data stream (e.g., the multi branch data stream 410). At block 510, the base station 120 decodes data from the multi-branch data stream. The decoding is a result of the base station 120 combining the determined second plurality of MA resources (determined at block 506) in accordance with the determined order of the first plurality of MA resources (determined at block 502).

Figure 6:
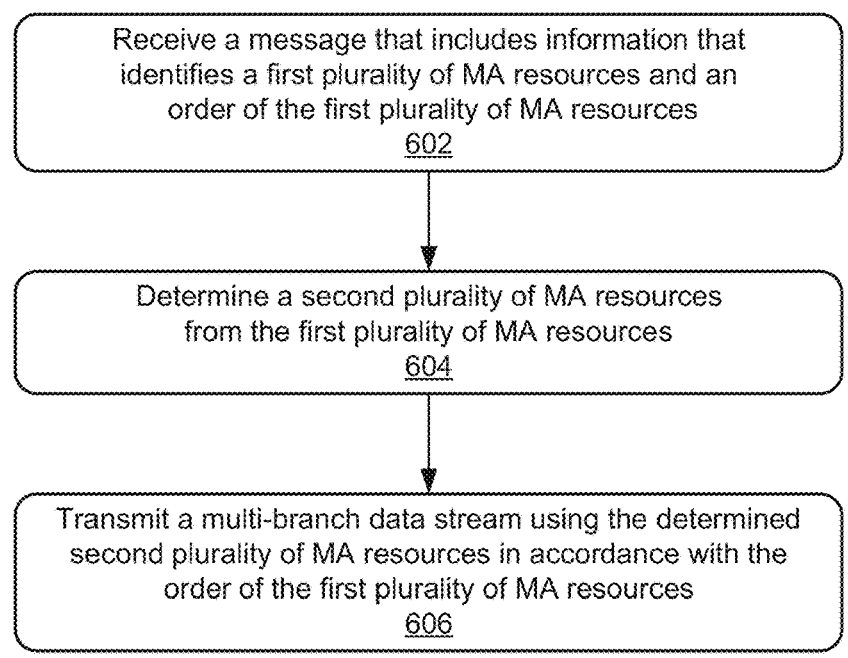
FIG. 6 illustrates an example method performed by a user equipment to transmit data through a multi-branch data stream in accordance with one or more aspects of multi-branch NOMA wireless communications.

FIG. 6 illustrates an example method 600 performed by a user equipment to transmit data through a multi-branch data stream to a base station in accordance with NOMA wireless communications. The method 600 is described in the form of a set of blocks 602-606 that specify operations that can be performed. However, operations are not necessarily limited to the sequence shown in FIG. 6 or described herein, for the operations may be implemented in alternative sequences or in fully or partially overlapping manners. Operations represented by the method 600 may be performed by the UE 110 of FIG. 1 and performed using elements of FIGS. 1-4.

At block 602, the UE 110 receives, from the base station 120, a message that includes information that identifies a determined first plurality of multiple access (MA) resources and a determined order of the first plurality of MA resources. The message may include, for example, identities of physical resources (e.g., resource block(s) 310 and resource element(s) 320) of an air interface (e.g., the air interface 302) linking the base station 120 to the UE 110 and a plurality of MA signature(s) (e.g., MA signature(s) 420), where each MA signature (e.g., MA signature 421 through 423) corresponds to a layer (e.g., layer 411 through 413) of the physical resources. The message may also include, in some instances, a mapping of available Demodulation Reference Signals (DMRS) or preambles.

At block 604, the UE 110 (e.g., the processor 210 of the UE 110 executing the code of the UE resource manager 216) determines a second plurality of MA resources that is a subset of the determined first plurality of MA resources. In an instance where the message received by the UE 110 includes the mapping of available DMRS or preambles, the UE 110 may use the mapping of the available DMRS or preambles to select the second plurality of MA resources from the first plurality of MA resources. In other instances, the UE 110 may autonomously select the second plurality of MA resources from the first plurality of MA resources.

At block 606 the UE 110 transmits, to the base station 120, the multi-branch data stream 410 using the determined second plurality of MA resources in accordance with the determined order of the first plurality of MA resources.

Signaling and Control Transactions

Figure 7:
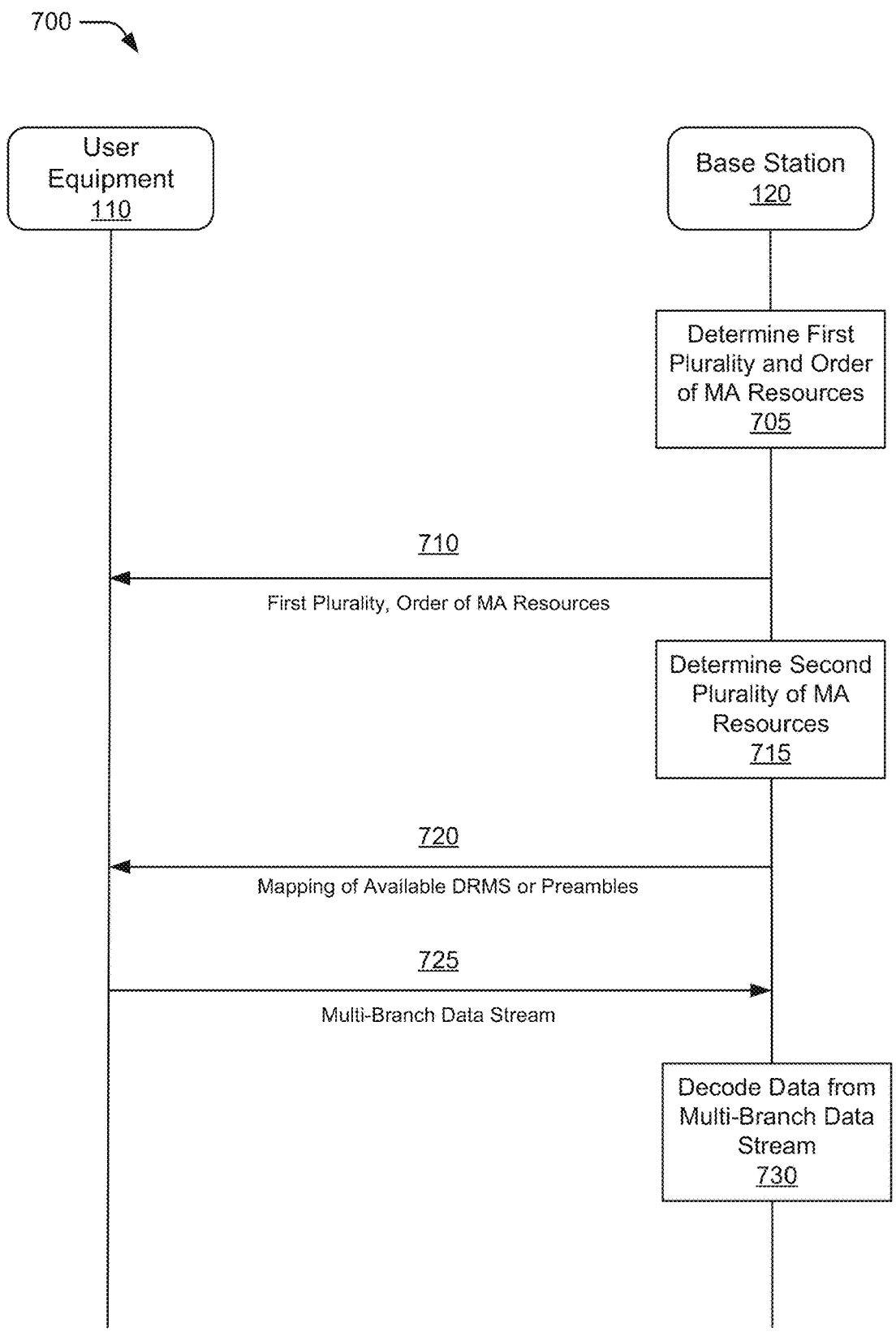
FIG. 7 illustrates an example signaling and control transaction diagram between a base station and a user equipment in accordance with one or more aspects of multi-branch NOMA wireless communications.
Figure 8:
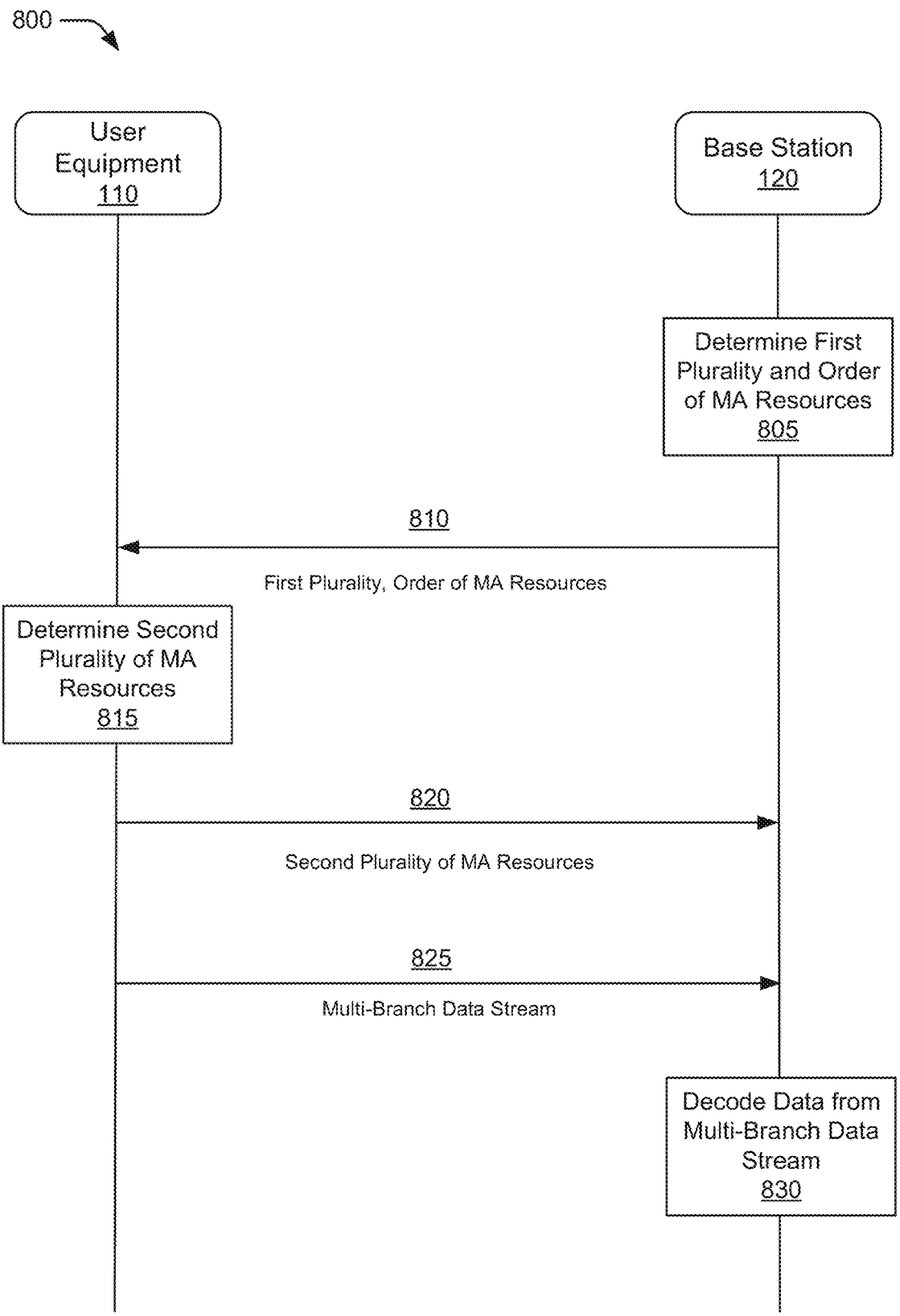
FIG. 8 illustrates another example signaling and control transaction diagram between a base station and a user equipment in accordance with one or more aspects of multi-branch NOMA wireless communications.

FIGS. 7 and 8 illustrate example signaling and control transaction diagrams between a base station and a user equipment in accordance with one or more aspects of multi-branch NOMA wireless communications. The signaling and control transactions may be performed by the base station 120 and the UE 110 of FIG. 1, using elements of FIGS. 1-4.

A first example of signaling and control transactions is illustrated by the signaling and transaction control diagram 700 of FIG. 7. As illustrated, at 705 the base station 120 determines a first plurality of multiple access (MA) resources and an order of the first plurality of MA resources. At 710, the base station transmits, to the UE 110, a message that includes the determined first plurality of MA resources and the determined order of the first plurality of MA resources. The message may include identities of physical resources of an air interface between the base station 120 and the UE 110, as well as a plurality of MA signatures. In some instances, the base station 120 may transmit the message using a broadcast signal or, alternatively, a dedicated signal such as a Radio Resource Control (RRC) message.

At 715, the base station 120 determines a second plurality of MA resources. In some instances, the base station 120 determines the second plurality of MA resources from a mapping between the first plurality of MA resources and available Demodulation Reference Signals (DMRS) or preambles. Such instances may include, for example, the base station 120 referencing a one-to-one mapping of MA resources to available DMRS or preambles and, upon detecting a presence of a particular DMRS or preamble, identifying a particular MA resource to which the particular DMRS or preamble is mapped.

At 720, the base station 120 transmits a message that includes the mapping to the UE 110. In some instances, the base station 120 may transmit the message using a broadcast signal or, alternatively, a dedicated signal such as Radio Resource Control (RRC) message.

At 725, the UE 110 transmits a multi-branch data stream to the base station 120. The multi-branch data stream (e.g., the multi-branch data stream 410 of FIG. 4) is transmitted using the determined second plurality of MA resources in accordance with the determined order of the first plurality of MA resources. The multi-branch data stream may include multiple layers of the determined second plurality of MA resources.

At 730, the base station 120 decodes data from the multi-branch data stream by combining the determined second plurality of MA resources in accordance with the determined order of the first plurality of MA resources. As an example, combining the determined second plurality of MA resources may include aggregating, in a sequence that corresponds to the determined first order of the first plurality of MA resources, layers of the second plurality of MA resources.

A second example of signaling and control transactions is illustrated by signaling and transaction control diagram 800 of FIG. 8. As illustrated, at 805 base station 120 determines a first plurality of multiple access (MA) resources and an order of the first plurality of MA resources. At 810, the base station 120 transmits, to the UE 110, a message that includes the determined first plurality of MA resources and the determined order of the first plurality of MA resources. The message may include identities of physical resources of an air interface between the base station 120 and the UE 110, as well as a plurality of MA signatures. In some instances, the base station 120 may transmit the message using a broadcast signal or, alternatively, a dedicated signal such as a Radio Resource Control (RRC) message.

At 815, the UE 110 determines a second plurality of MA resources. As illustrated in this example, the UE 110 may determine the second plurality of MA resources by autonomously selecting the second plurality of MA resources from the first plurality of MA resources.

At 820, the UE 110 transmits to the base station 120 a message that identifies the determined second plurality of MA resources. In some instances, the message may be an Uplink Control Information (UCI) message.

At 825, the UE 110 transmits a multi-branch data stream to the base station 120. The multi-branch data stream (e.g., the multi-branch data stream 410 of FIG. 4) is transmitted using the determined second plurality of MA resources in accordance with the determined order of the first plurality of MA resources. The multi-branch data stream may include multiple layers of the determined second plurality of MA resources.

At 830, the base station 120 decodes data from the multi-branch data stream by combining the determined second plurality of MA resources in accordance with the determined order of the first plurality of MA resources. As an example, combining the determined second plurality of MA resources may include aggregating, in a sequence that corresponds to the determined first order of the first plurality of MA resources, layers of the second plurality of MA resources.

Although aspects of multi-branch NOMA wireless communication have been described in language specific to features and/or methods, the subject of the appended claims is not necessarily limited to the specific features or methods described. Rather, the specific features and methods are disclosed as example implementations of multi-branch NOMA wireless communication, and other equivalent features and methods are intended to be within the scope of the appended claims. Further, various different aspects are described, and it is to be appreciated that each described aspect can be implemented independently or in connection with one or more other described aspects.

In the following, several examples are described.

Example 1: A method for decoding data received through a multi-branch data stream, the method performed by a base station and comprising: determining, by the base station, a first plurality of multiple access resources and an order of the first plurality of multiple access resources; transmitting, by the base station and to a user equipment, a message, the message including information that identifies the determined first plurality of multiple access resources and the determined order of the first plurality of multiple access resources; determining, by the base station, a second plurality of multiple access resources, the second plurality of multiple access resources being a subset of the determined first plurality of multiple access resources; receiving, by the base station and from the user equipment, the multi-branch data stream; and decoding by the base station, data from the multi-branch data stream, the decoding being a result of the base station combining the determined second plurality of multiple access resources in accordance with the determined order of the first plurality of multiple access resources.

Example 2: The method as recited in example 1, wherein the transmitting the message includes transmitting: identities of physical resources of an air interface linking the base station to the user equipment; and a plurality of multiple access signatures, each multiple access signature corresponding to a layer of the physical resources.

Example 3: The method as recited in example 2, wherein each multiple access signature includes an orthogonal code, a spreading code, or a transmission power.

Example 4: The method as recited in example 2 or example 3, wherein the message is transmitted using: a broadcast signal; or a Radio Resource Control message.

Example 5: The method as recited in any of examples 1 to 4, wherein the determining the second plurality of multiple access resources comprises: using a mapping between the first plurality of multiple access resources and available demodulation reference signals or preambles.

Example 6: The method as recited in example 5, further comprising: transmitting, by the base station to the user equipment, another message that includes the mapping between the first plurality of multiple access resources and available demodulation reference signals or preambles.

Example 7: The method as recited in example 6, wherein the other message is transmitted using: a broadcast signal; or a Radio Resource Control message.

Example 8: The method as recited in any one of the examples 1 to 7, wherein the order of the first plurality of multiple access resources is determined by the base station from a wireless-communication specification that is available to the base station and the user equipment.

Example 9: The method as recited in any one of examples 1 to 4, wherein the determining the second plurality of multiple access resources comprises: receiving an uplink control information message from the user equipment that identifies the second plurality of multiple access resources.

Example 10: A method for transmitting data through a multi-branch data stream to a base station, the method performed by a user equipment and comprising: receiving, by the user equipment and from the base station, a message, the message including information that identifies a determined first plurality of multiple access resources and a determined order of the first plurality of multiple access resources; determining, by the user equipment, a second plurality of multiple access resources, the determined second plurality of multiple access resources being a subset of the determined first plurality of multiple access resources; and transmitting, by the user equipment and to the base station, the multi-branch data stream using the determined second plurality of multiple access resources in accordance with the determined order of the first plurality of multiple access resources.

Example 11: The method as recited in example 10, wherein the message includes: identities of physical resources of an air interface linking the base station to the user equipment; and a plurality of multiple access signatures, each multiple access signature corresponding to a layer of the physical resources.

Example 12: The method as recited in example 10 or example 11, wherein the determining the second plurality of multiple access resources comprises: autonomously selecting the second plurality of multiple access resources from the first plurality of multiple access resources.

Example 13: The method as recited in example 10 or example 11, further comprising: receiving another message that includes a mapping between the first plurality of multiple access resources and available demodulation reference signals or preambles.

Example 14: The method as recited in example 13, wherein the determining the second plurality of resources comprises: using the mapping between the first plurality of multiple access resources and available demodulation reference signals or preambles.

Example 15: A base station comprising: a wireless transceiver; a processor; and computer-readable storage media comprising instructions to implement a base station resource manager, the base station resource manager upon execution by the processor directing the base station to perform any one of the methods of examples 1 to 9.

Example 16: A user equipment comprising: a wireless transceiver; a processor; and computer-readable storage media comprising instructions to implement a user equipment resource manager, the user equipment resource manager upon execution by the processor directing the user equipment to perform any one of the methods of examples 10 to 14.

What is claimed is:

1. A method of wireless communication at a base station, the method comprising:
   transmitting, by the base station and to a user equipment, a message including information that identifies a first plurality of multiple access resources and an order of the first plurality of multiple access resources;
   determining, by the base station, a second plurality of multiple access resources, the second plurality of multiple access resources being a subset of the first plurality of multiple access resources;
   receiving, by the base station and from the user equipment, a multi-branch data stream in accordance with multi-branch non-orthogonal multiple access (NOMA) communications; and
   decoding by the base station, data from the multi-branch data stream, the decoding being a result of the base station combining the determined second plurality of multiple access resources in accordance with the order of the first plurality of multiple access resources.

2. The method as recited in claim 1, wherein the order of the first plurality of multiple access resources is determined by the base station from a wireless-communication specification that is available to the base station and the user equipment.

3. The method as recited in claim 1, wherein the determining the second plurality of multiple access resources comprises:
   receiving an uplink control information message from the user equipment that identifies the second plurality of multiple access resources.

4. The method as recited in claim 1, wherein the transmitting the message includes transmitting:
   identities of physical resources of an air interface linking the base station to the user equipment; and
   a plurality of multiple access signatures, each multiple access signature corresponding to a layer of the physical resources.

5. The method as recited in claim 4, wherein each multiple access signature includes an orthogonal code, a spreading code, or a transmission power.

6. The method as recited in claim 1, wherein the message is transmitted using a broadcast signal.

7. The method as recited in claim 1, wherein the message is transmitted using a Radio Resource Control message.

8. The method as recited in claim 1, wherein the determining the second plurality of multiple access resources comprises:
   using a mapping between the first plurality of multiple access resources and available demodulation reference signals or preambles.

9. The method as recited in claim 8, further comprising:
   transmitting, by the base station to the user equipment, another message that includes the mapping between the first plurality of multiple access resources and available demodulation reference signals or preambles.

10. The method as recited in claim 9, wherein the other message is transmitted using a broadcast signal.

11. The method as recited in claim 9, wherein the other message is transmitted using a Radio Resource Control message.

12. A method of wireless communication at a user equipment, the method comprising:
    receiving, by the user equipment and from a base station, a message including information that identifies a first plurality of multiple access resources and an order of the first plurality of multiple access resources;
    determining, by the user equipment, a second plurality of multiple access resources, the determined second plurality of multiple access resources being a subset of the first plurality of multiple access resources; and
    transmitting, by the user equipment and to the base station, a multi-branch data stream in accordance with multi-branch non orthogonal multiple access (NOMA) communications and using the determined second plurality of multiple access resources in accordance with the order of the first plurality of multiple access resources.

13. The method as recited in claim 12, wherein the message includes:
    identities of physical resources of an air interface linking the base station to the user equipment; and a plurality of multiple access signatures, each multiple access signature corresponding to a layer of the physical resources.

14. The method as recited in claim 12, wherein the determining the second plurality of multiple access resources comprises:
autonomously selecting the second plurality of multiple access resources from the first plurality of multiple access resources.

15. The method as recited in claim 12, further comprising:
receiving, from the base station, another message that includes a mapping between the first plurality of multiple access resources and available demodulation reference signals or preambles.

16. The method as recited in claim 15, wherein the determining the second plurality of resources comprises:
using the mapping between the first plurality of multiple access resources and available demodulation reference signals or preambles.

17. A base station comprising:
a wireless transceiver;
a processor; and
computer-readable storage memory comprising instructions to implement a base station resource manager, the base station resource manager upon execution by the processor directing the base station to
determine a first plurality of multiple access resources and an order of the first plurality of multiple access resources;
transmit, to a user equipment, a message, the message including information that identifies the determined first plurality of multiple access resources and the determined order of the first plurality of multiple access resources;
determine a second plurality of multiple access resources, the second plurality of multiple access resources being a subset of the determined first plurality of multiple access resources;
receive, from the user equipment, a multi-branch data stream; and decode data from the multi-branch data stream, the decoding being a result of the base station combining the determined second plurality of multiple access resources in accordance with the determined order of the first plurality of multiple access resources.

18. The base station of claim 17, wherein the base station resource manager upon execution by the processor further directs the base station to:
transmit, to the user equipment, another message that includes a mapping between the first plurality of multiple access resources and available demodulation reference signals or preambles.

19. A user equipment comprising:
a wireless transceiver;
a processor; and
computer-readable storage memory comprising instructions to implement a user equipment resource manager, the user equipment resource manager upon execution by the processor directing the user equipment to:
receive, from a base station, a message, a message including information that identifies a determined first plurality of multiple access resources and a determined order of the first plurality of multiple access resources;
determine a second plurality of multiple access resources, the determined second plurality of multiple access resources being a subset of the determined first plurality of multiple access resources; and
transmit, to the base station, a multi-branch data stream using the determined second plurality of multiple access resources in accordance with the determined order of the first plurality of multiple access resources.

20. The user equipment of claim 19, wherein the user equipment resource manager upon execution by the processor further directs the user equipment to:
receive, from the base station, another message that includes a mapping between the first plurality of multiple access resources and available demodulation reference signals or preambles.

* * * * *